United States Patent
Tjernberg et al.

(10) Patent No.: US 12,473,178 B2
(45) Date of Patent: Nov. 18, 2025

(54) CRANE WITH CRANE CONTROL

(71) Applicant: Komatsu Forest AB, Umeå (SE)

(72) Inventors: Fredrik Tjernberg, Holmsund (SE); Daniel Linder, Umeå (SE)

(73) Assignee: Komatsu Forest AB, Umeå (SE)

( * ) Notice: Subject to any disclaimer, the term of this patent is extended or adjusted under 35 U.S.C. 154(b) by 0 days.

(21) Appl. No.: 18/689,012

(22) PCT Filed: Sep. 2, 2022

(86) PCT No.: PCT/SE2022/050784
§ 371 (c)(1),
(2) Date: Mar. 4, 2024

(87) PCT Pub. No.: WO2023/033706
PCT Pub. Date: Mar. 9, 2023

(65) Prior Publication Data
US 2024/0367948 A1 Nov. 7, 2024

(30) Foreign Application Priority Data
Sep. 6, 2021 (SE) .................. 2151107-6

(51) Int. Cl.
*B66C 13/46* (2006.01)
*B66C 13/48* (2006.01)
*A01G 23/00* (2006.01)

(52) U.S. Cl.
CPC .............. *B66C 13/48* (2013.01); *B66C 13/46* (2013.01); *A01G 23/003* (2013.01)

(58) Field of Classification Search
CPC ......... B66C 13/46; B66C 23/42; B66C 23/58; A01G 23/00; A01G 23/081; A01G 23/003;

(Continued)

(56) References Cited

U.S. PATENT DOCUMENTS

2014/0178166 A1* 6/2014 Andruch, III ........... E02F 3/436
   414/815
2017/0000045 A1* 1/2017 Linder ................. A01G 23/081
(Continued)

FOREIGN PATENT DOCUMENTS

EP         3556709 B1    3/2020
WO    WO 2020/191421 A1  10/2020

OTHER PUBLICATIONS

International Search Report issued in International Application No. PCT/SE2022/050784, mailed on Nov. 9, 2022.

(Continued)

*Primary Examiner* — Kenneth J Malkowski
(74) *Attorney, Agent, or Firm* — Knobbe, Martens, Olson & Bear, LLP

(57) ABSTRACT

A crane with a crane control, wherein the crane control includes rises a coordinate control system with a plurality of nodes defined in the crane, a three-axis coordinate system including x, y and z axes that intersect each other in orthogonal main planes in the space, a node information processing module, a route establishment module and an operation processing module, wherein the node information processing module is configured to collect and store node information in an initial state of the crane, and the route establishment module is configured, based on a control command indicated by a crane operator, to establish an effective operation path for each node to a route in which the operation module is used, in an actual route, for displacing a crane tip included in the crane from a current starting or initial coordinate position in the initial state to a desired target coordinate position in the space.

12 Claims, 5 Drawing Sheets

(58) Field of Classification Search
CPC ...... A01G 23/08; A01G 23/083; A01G 23/06; A01G 23/091
See application file for complete search history.

(56) References Cited

U.S. PATENT DOCUMENTS

| | | |
|---|---|---|
| 2017/0029252 A1* | 2/2017 | Deimer .................... B60P 1/54 |
| 2018/0273350 A1 | 9/2018 | Steindl et al. |
| 2019/0308851 A1 | 10/2019 | Gustafsson et al. |
| 2021/0276838 A1* | 9/2021 | Minami ................. B66C 13/42 |

OTHER PUBLICATIONS

Search Report issued in Swedish Application No. 2151107-6, dated Apr. 28, 2022.

* cited by examiner

| Position change | Lift arm | Rocker arm | Telescopic arm |
|---|---|---|---|
| In (-dX) | Locked/Flexible | In | In |
| Out (+dX) | Locked/Flexible | Out | Out |
| Up (+dY) | Up | Locked/Flexible | In |
| Up (-dY) | Down | Locked/Flexible | Out |

CRANE WITH CRANE CONTROL

TECHNICAL FIELD

The invention relates to a crane with crane control according to the preamble of claim 1 and a forest machine equipped with such crane according to claim 11.

BACKGROUND

A crane with crane control, for example in the form of a hydraulic knuckle-boom crane, consists of a so-called pillar or body, which is rotatable about a vertical rotational axis, and a crane boom system, which is mounted on the pillar and is intended for carrying a load in a crane tip (Tool Center Point, TCP) at an outer end of the crane boom system. The crane boom system in a knuckle-boom crane normally comprises two or more liftable and lowerable crane booms that form a connection between the crane tip and the pillar, which crane booms are mutually articulately connected. The crane also comprises an operating unit with one or more joysticks (control stick) configured to be operable by a crane operator to control the movements of the crane boom. To facilitate the operator's control of the position of the crane tip in the space in a correct manner, the control of the crane boom motions can advantageously be based on a so-called coordinate control system by which the crane can be controlled based on the desired positioning of for example the crane or boom tip. Coordinate control of the crane tip implies that the operator's focus is moved from how each joint on the crane is to be controlled to only being concerned with how the crane tip is to be controlled, i.e. how the crane tip can be displaced in/out and up/down, respectively, in the space to reach each desired position. Crane tip control implies that the crane tip motions in principle can be controlled with one single joystick.

In the case of crane tip control, two joysticks are usually used in practice, though, whereby a first joystick is used for controlling the pivotal motions of the pillar and thereby the crane boom system in a horizontal plane about said vertical rotational axis, and a second joystick is used for controlling the crane tip motion in a vertical plane in height Up/Down as well as for controlling the crane tip motion in a horizontal plane In/Out with respect to the basis of the crane. Normally, the left joystick is used for: Crane oscillation (x direction, and crane in/out (y direction) and the right joystick for: Rotator (x direction) and crane up/down (y direction).

In connection with the crane operator positioning the crane tip, individual crane boom motions in the crane boom system are regulated by a computer-based crane control due to control signals from the respective joysticks of the operating unit and a calculation model for controlling the crane tip of the crane boom system, wherein the calculation model is established by the crane manufacturer in accordance with a predetermined control and monitoring strategy. Thus, when crane tip control is used, the crane operator has no direct control of the position of the individual crane booms. Instead the crane control calculates how the individual crane booms are to be moved to cause the crane tip to follow the path indicated by the crane operator via the control command on the operating unit.

Crane tip control is usually based on orthogonal coordinate systems or on cylindrical coordinate systems in the three-dimensional space. Regardless of the choice of coordinate system, it is a problem that the state of the crane tip relative to the joystick comprises a very large number of degrees of freedom and that each desired movement from a starting or reference point to a desired target point can, in principle, be reached in an infinite number of ways, which makes configuration of prior art crane controls very complex.

In a crane, pivoting about a vertical axis takes place on the pillar, wherein the crane has a certain degree of the motion freedom due to its pivotal mounting about the vertical axis of the pillar. The first arm is pivotably mounted on the pillar and can move over a structural predetermined pivot range of the arm, whereby said first arm has a certain degree of motion freedom due to its pivotal mounting. The second arm, which is pivotably mounted on the first arm, can move over a structural predetermined jointed pivot range, whereby said second arm has a certain degree of freedom due to its pivotal mounting. Said second arm, which can furthermore be telescopically extendable, is in the present case mounted in the second arm in such a manner that it can be displaced over a structural predetermined range and has a degree of freedom due to the displaceable mounting thereof. The arm system in a knuckle-boom crane consequently has four degrees of freedom, comprising three rotational motions at the pivot joints between the arm parts and a linear translation motion for the sliding boom.

In the following, the term node refers to each predeterminedly defined point in a crane such as an intersection point (pivot point or pivot joint), branch or end point of the arm parts included in a crane arm system of a crane and are moveably related to a system of orthogonal coordinate axes in a three-dimensional space. In addition to joint axes, the tip of the crane (crane tip) can constitute a node of the crane. The term degree of freedom or degrees of freedom refers to the number of independent motions that a crane arm system of a crane can make with respect to a system of orthogonal coordinate axes in a three-dimensional space including x, y and z axes that intersect each other in orthogonal main planes in the space, As crane boom systems often have more degrees of freedom than is theoretically necessary for the crane tip from a starting position to reach each desired point or target position in the space, it has so far been difficult to calculate and determine a suitable path or route for the crane tip depending on the crane arm systems being mathematically "underdetermined".

As a result, for each imaginable motion path that the crane tip can follow in a coordinate control, there is an infinite number of imaginable paths that the joints in the arm system can follow for the crane tip to reach a desired target point. Initially, the problems are mentioned with arm systems with telescoping projections and such arm systems being underdetermined purely mathematically, while the crane tip in principle is capable of reaching each point in the space in an infinite number of ways. However, by choosing suitable algorithms and prioritizing the motion scheme of the crane parts, it is possible to optimize the motion speed from a starting point to a target point. For example, it has turned out to be advantageous, to the greatest extent possible, to prioritize said second crane arm (rocker arm) and its telescoping projection.

The infinite amount of alternative motion paths of the arm system when choosing a control strategy can usually be reduced by analysis of the influence of the projection on lifting power and the crane tip velocity as well as analysis of which crane parts that are to be rewarded for the crane tip to reach a certain point in the space. Alternatively, specific path choices can be discarded, for example to avoid restraint due to structural restrictions of the crane as such, structural restraint of the vehicle on which the crane is mounted, or restraint in the surroundings of the crane can also be taken into consideration when calculating a suitable choice of path or route for the crane tip.

Each point (node) on the crane is thus related to a system of orthogonal coordinate axes in a three-axis coordinate system with x, y and z axes in the space. The number of independent motions that the crane can make regarding a specific coordinate system constitutes the degrees of freedom of the crane. A conventional knuckle-boom crane, for instance, has four degrees of freedom, three rotational motions and one translational motion. The coordinate transformation of the state of the crane tip to the crane foot or another selected fixed point on the machine is obtained through mathematical transformation. This type of coordinate transformation has been known for a long time and will therefore not be described in further detail.

Determining a control strategy, i.e. selection of motion path for the crane parts and associated joint velocities, is usually carried out through so-called backward transformation or kinematic reversal in the computer of the crane control after specification of the desired path in Cartesian coordinates for the crane tip, i.e. after the crane operator has issued a corresponding control command with the desired motion path for the crane tip to a target position. From this control command the actuators and activators (hydraulic and/or electric actuators) included in the arm system control the arm system along the selected degrees of freedom for the crane tip to reach the desired target position.

The crane tip velocity is controlled by means of a velocity model, whereby increased stick deflection of the operator's joystick implies increased motion speed of the crane tip. Speed calculations are usually based on time derivatives in Jacobian matrices. However, speed calculation requires that the Jacobian matrix is quadric and invertible, which in practice is never the case of conventional cranes. For inversion of such matrices, certain additional conditions must therefore be introduced, which are usually termed weighting matrices. The construction of such weighting matrices is not trivial, as they will constitute a part of a mathematical solution to a mechanical problem. For the same reason, error search in the coordinate control systems known so far has turned out to be time-consuming and difficult to carry out in practice.

To obtain unambiguous solutions for such backward transformations in a given arm system, the backward transformation must be performed by the introduction of suitable optimization criteria of the Jacobian matrices, usually by so-called weighting matrices and similar approximations that are based on desired structural restrictions of the crane system, such as for example maximum lifting power, maximum motion speed etc. A problem with said known types of cranes with crane controls using Jacobian matrices in combination with various types of weighting matrices is that they have strong requirements for computer capacity due to extensive and advanced program code and thus also considerable computation efforts. Another problem is that the construction of each weighting matrix is a mathematical solution of a mechanical problem, and in practice it is difficult to find a suitably weighted compromise between different engineering disciplines that suits each individual operator of the crane, so that undesired motion patterns can be avoided to the greatest possible extent and due to which the individual operator may experience motions in the crane arm system that are not directly predicable.

SUMMARY OF THE INVENTION

An object of the invention is to obtain a crane with a crane control that enables coordinate control and is simpler than hitherto known crane control systems, and wherein the complexity of the backward transformation can be substantially reduced. Another object of the invention is to obtain a crane with a crane control, wherein problems for the operator with unpredictable motions of the crane arm system can be avoided. A third object of the invention is to obtain a crane, the computer-based crane control system of which is so simplified that maintenance and error search are facilitated. A fourth object of the invention is to obtain a forest machine, such as a forwarder, harvester or similar tree handling machines equipped with cranes, and the crane of which can precisely and efficiently follow the indicated control command, without risk of the occurrence of unexpected motions of the crane.

These objects of the invention are achieved with a crane with a crane control that have obtained the features and characteristics indicated in claim 1 as well as with a forest machine, such as a forwarder or harvester equipped with such a crane with crane control according to claim 11.

According to an embodiment, the crane according to the invention comprises a crane control, in which a route establishment module is included, which, in a preparatory computation step, is configured to plan the actual motion of the crane tip (TCP) along the route by dividing the effective operation path for each node into a series of fictional partial steps, wherein a predetermined mobility status is assigned to each node, whereby a predetermined procedure generates a control strategy that assigns the mobility status to each node based on an instruction indicated by the operator in the control command.

Due to the actual motion of the crane tip being divided into a series of fictional smaller partial problems in a preparatory displacement step, wherein different mobility statuses are assigned to the nodes defined in the crane a via a predetermined control strategy indicated by a procedure, both backward transformation and speed calculation of joint and translation speeds of the crane can be simplified substantially, and the desired crane motion can furthermore be executed efficiently.

Unlike the Jacobean matrix, which calculates transformation motions of an arm system via a combination with various weighing matrices, the crane control according to the present invention applies a calculation model that is mathematically determined by allocation of a locked mobility status to at least one node in each fictional partial step. By the crane control, in a fictional calculation step, performing a stepwise displacement of the crane tip in the space with an X component and a Y component that are orthogonal or perpendicular to each other, and which intersect each other in a fictional point B generated in the preparatory calculation step, the calculations are simplified without a need for weighting matrices and a crane control is obtained, which accurately and efficiently can follow the control command indicated by the operator The calculation model of the crane control specifies an order of priority in which different pivot points in the crane arm system are allowed to move in specific directions In/Out and Up/Down, respectively, based on an instruction in the control command indicated by the operator. Said instruction can for example be related to a direction of motion and crane tip velocity indicated by the operator. Dividing the crane tip motion into fictional orthogonal motion steps in the X plane/Y plane in/out in this manner according to the present invention in order to achieve specific equation systems with as many equations as unknown variables are in the following termed "Application Logic Model" (ALM).

The insight providing the basis for the invention is that the mathematical solution to the crane control problem is substantially facilitated, if it is possible to fix at least one of the joints in the calculation, so that there are as many unknown quantities (joints to be moved) and equations X=f (changes in joints) and Y=f (changes in joints).

According to another embodiment, the invention comprises another procedure, which during the preparatory calculation step controls and regulates a sequence or order of priority, in which motion freedom in each translative partial step and thereby different degrees of freedom of the crane is assigned to nodes included in the crane.

According to another embodiment, the crane control comprises another calculation unit, which, in the preparatory calculation step, is configured to determine a modified control strategy with respect to a risk detected by the calculation unit of losing a degree of motion freedom in the crane, for example depending on any of the actuators and activators included in the crane being forced to bypass their end position for the crane tip TCP to reach a desired target coordinate position TP in the space.

In another embodiment, the dynamic model comprises a motion-restricting procedure that can restrict the motion speed of the nodes within one or a plurality of predetermined zones Z:1-Z:n in the three-dimensional coordinate system in the space, for example to avoid collision with machine structures or similar objects that the crane may meet during displacement and the instructions given as input to the route establishment module.

DESCRIPTION OF FIGURES

In the following, the invention is described in detail with reference to the accompanying drawings, in which.

DESCRIPTION OF EMBODIMENTS

Figure 1A:
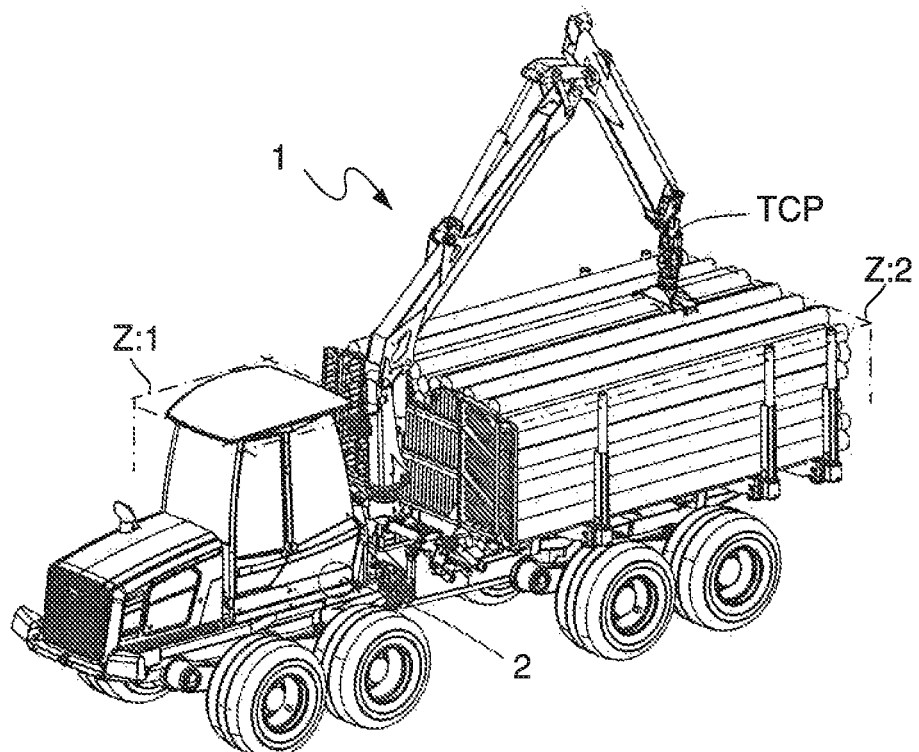
FIG. 1a shows a perspective view of a forest machine in the form of a forwarder equipped with a crane with crane control according to the present invention.

FIG. 1a shows a forest machine in the form of a forwarder with a crane 1 (knuckle-boom crane) having an arm system, which crane is equipped with a crane control generally denoted 2, enabling a crane operator to control the crane by means of so-called coordinate control based on the crane tip TCP according to the invention.

Figure 1B:
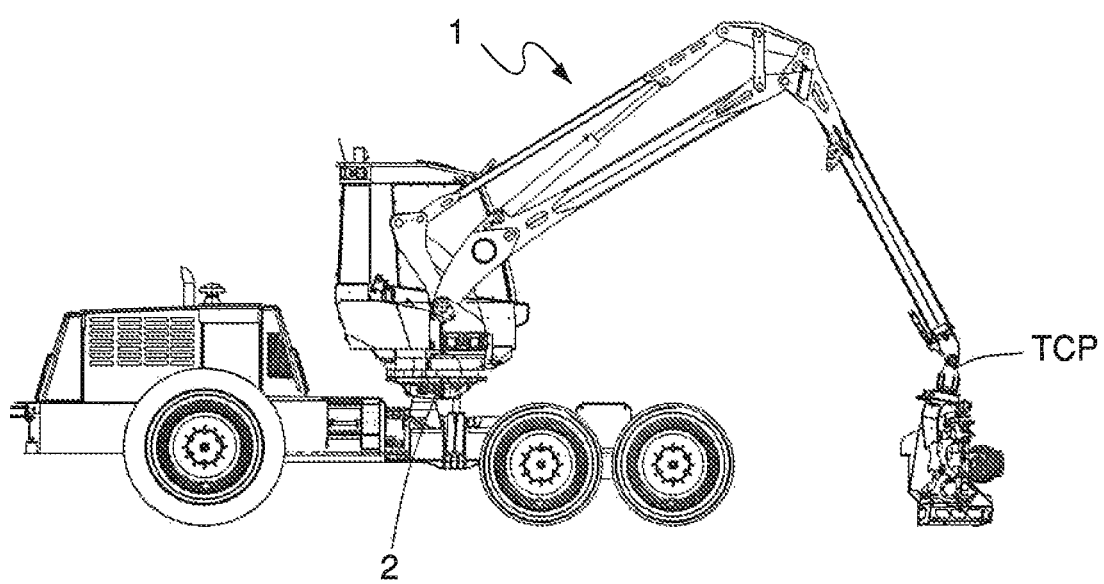
FIG. 1b shows a forest machine in the form of a harvester equipped with a crane with crane control according to the present invention.

FIG. 1b shows a forest machine in the form of a harvester with a crane 1 (knuckle-boom crane with a rotatable turntable instead of crane pillar) having an arm system, which crane is equipped with a crane control generally denoted 2, enabling a crane operator to control the crane by means of so-called coordinate control based on the crane tip TCP according to the present invention.

In the following, it should be understood that the crane 1 with associated crane control 2 according to the invention could comprise any known type of crane with an arm system for handling of goods, also a crane of the type intended to be used for load handling at a truck such as a timber truck or similar cargo vehicle.

According to the invention, the crane 1 with computer-based crane control 2 can be configured to be switched to various operating modes of which; a first operating mode could comprise operating mode for coordinate control, whereby the arm system 1 is controlled and monitored on the basis of the desired motions from the crane tip TCP. The crane control 2 can also be configured, such that the crane can be operated in another operating mode for conventional manual control of the crane and thus via separate control and monitoring of each separate actuator of the crane. The crane control 2 can suitably be configured, such that an operator, via a selector switch or similar operator interface included in the crane control 2, can easily switch between said respective operating modes for the crane. In an embodiment, it is also imaginable that the operating modes could be switched automatically depending on the crane configuration, selected functions in the control system or otherwise the status of the machine.

Figure 2:
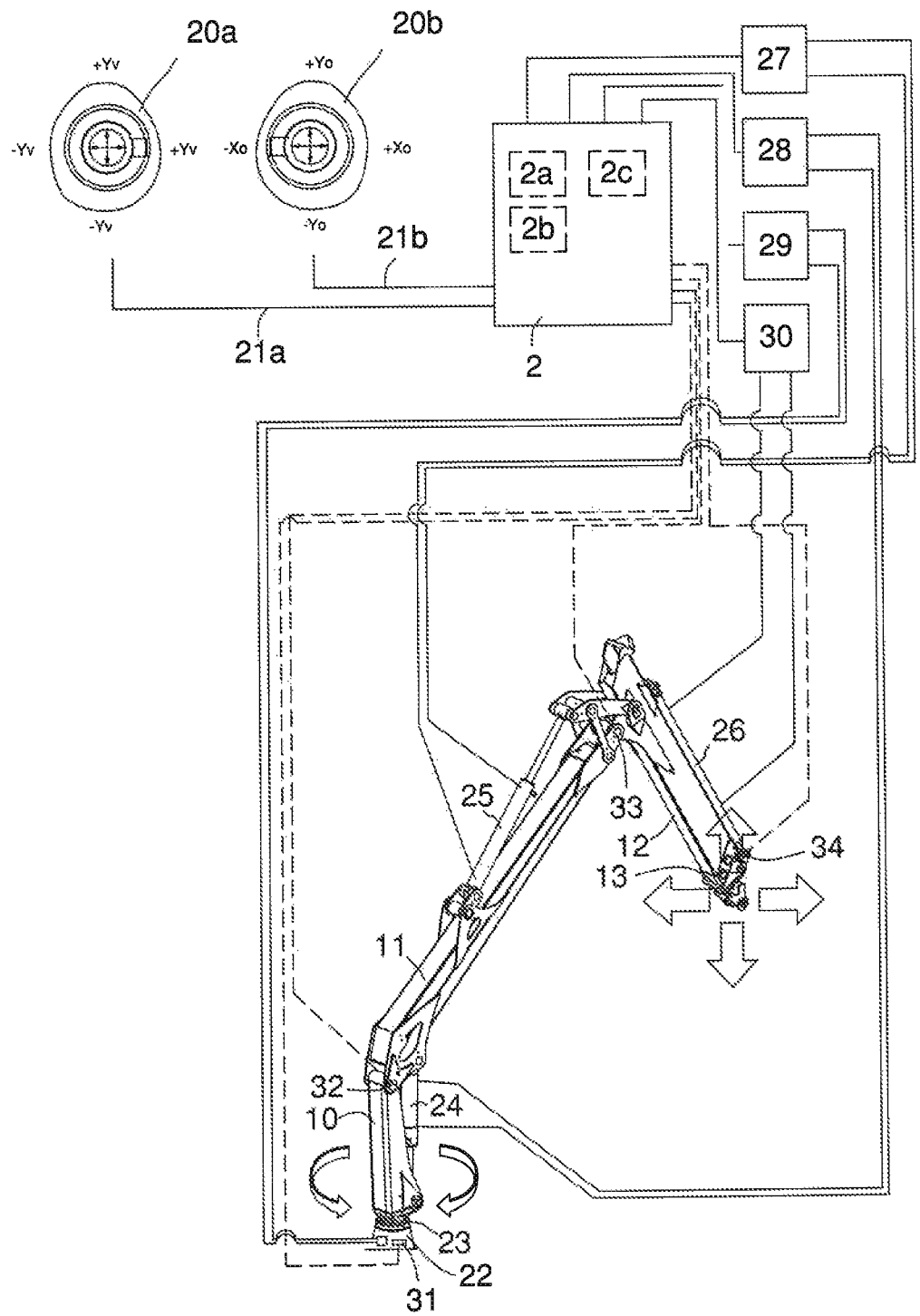
FIG. 2 shows a schematic principal view of joysticks (operating levers) comprised in a crane with crane control according to the present invention, and which joysticks are configured for influence by a crane operator for controlling and monitoring the crane.
Figures 3, 4:
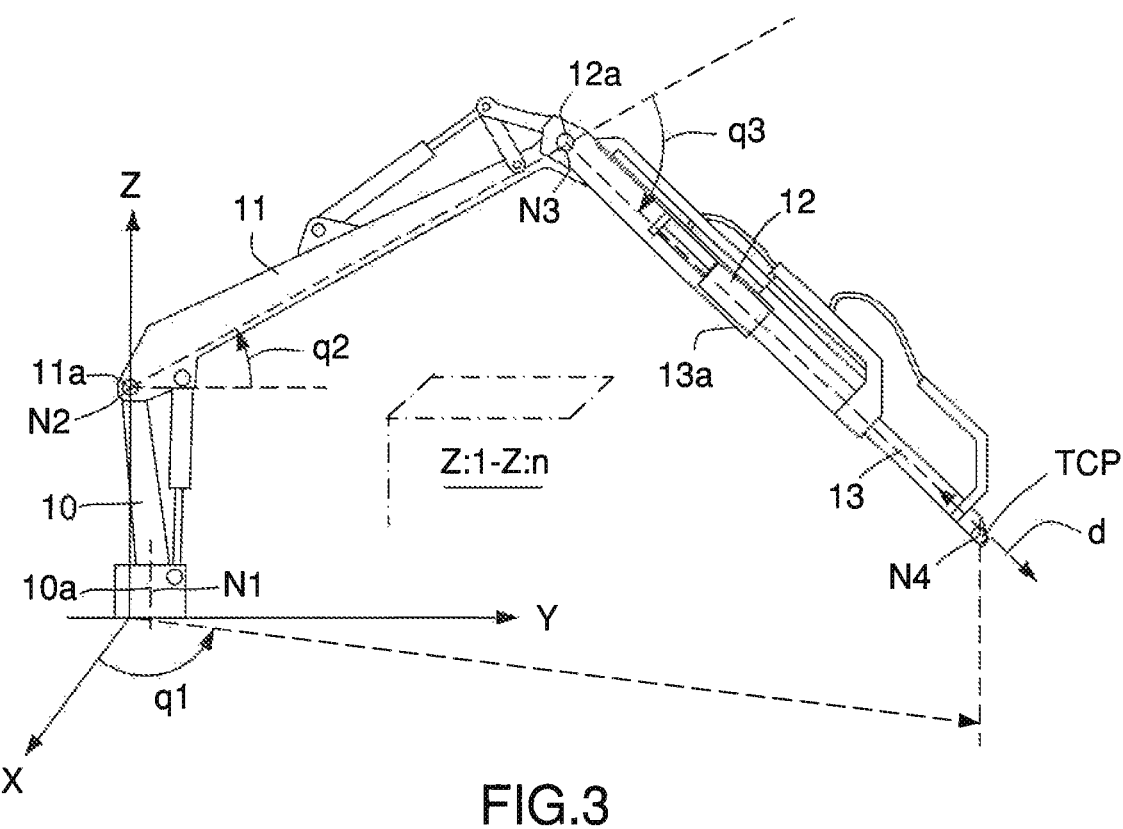
FIG. 3 shows a crane (knuckle-boom crane) with crane control according to the invention with four degrees of motion freedom, FIG. 4 schematically shows a procedure or an algorithm used for generating a control strategy for a crane control according to the invention, FIG. 5 schematically shows a block diagram of the operation of a crane control that can be included in a crane according to the present invention, FIG. 6 schematically shows a block diagram of control and monitoring functions that can be included in a crane according to the present invention.

With reference to FIGS. 2 and 3, the present crane 1 with crane control 2, more specifically in which the crane comprises a crane pillar 10, which is rotatable about a vertical joint shaft 10a and pivotable over a predetermined structural pivot range and having a degree of freedom q1 due to its pivotable mounting in a first node N1, a first crane arm 11 (lift arm), which is pivotable on a first horizontal joint shaft 11a, which at the same time defines a second node N2 mounted on the pillar 10 and being pivotable over a structural predetermined pivot range and having a degree of freedom q2 due to its pivotable mounting, a second crane arm 12 (rocker arm), which is pivotably mounted on the first crane arm 11 via a second horizontal joint shaft 12a, which at the same time defines a third node N3, and which second crane arm is pivotable over a structural predetermined pivot area and has a degree of freedom q3 due to its pivotable mounting, a sliding boom 13, which is slidingly mounted in the second crane arm 12 via a linear sliding guide 13a and is slidable over a structural predetermined sliding range and has a degree of freedom d due to its displaceable mounting and is a fourth node N4 defined in the crane tip TCP.

FIG. 2 shows in more detail how the crane 1 with crane control 2 is configured to be controlled and monitored by an operator (not shown) in an driver's cabin (see FIGS. 1a, 1b). For the purpose, the crane control 2 can comprise a first joystick 20a for the left hand respectively a second joystick 20b for the right hand. The control command generated by the operator via said joysticks 20a, 20b is transferred via the communication buses 21a, 21b to the crane control unit 2, which in turn, through activation of hydraulic actuators and activators 23, 24, 25, 26 operate the different crane parts; crane pillar 10, the first crane arm 11, the second crane arm 12 and sliding boom 13 via a control interface comprising electromagnetic valves 27, 28, 29, 30.

Also with reference to FIG. 2, measuring elements 31, 32, 33, 34 are arranged to the pivotable assemblies 10a, 11a, 12a, 13a between the different crane parts; the crane pillar 10, the first crane arm 11, the second crane arm 12 and the sliding boom 13. The measuring elements 31, 32, 33, 34, measure the state of the crane pillar 10 (the rotation angle relative to a given basic state), the state of the first crane arm 11 and the second crane arm 12 relative to each other can comprise angle sensors that measure rotational motions in each pivotally movable node in the crane arm system, while the measuring element 34 that measures the translation motion of the gliding boom 13 can comprise a linear measurement sensor. The measuring elements 31, 32, 33, 34 are connected to the crane control 2 in such a manner that the crane control 2 can receive measuring data produced by the measuring elements.

As shown in FIG. 3, the crane control 2 included in the crane comprises a coordinate control system and a three-axis coordinate system with x, y and z axes intersecting each other in orthogonal main planes in the space. Based on information from the above-mentioned measuring elements 31, 32, 33, 34, the position of each of said nodes N1, BN2, N3 and N4 in a crane can be determined and thereby also the structural state of the crane in the three-axis coordinate system.

The crane control 2 comprises a node information processing module 2a, a route establishment module 2b and an operation processing module 2c, wherein the node information processing module is configured to collect and store node information in an initial state of the crane. The route establishment module 2b is configured such that, based on a control command indicated by the operator, an effective operation path is established for each node N1, N2, N3, N4 for a route in which the operation module 2c is used for displacing the crane tip TCP included in the crane and thus also the node N4 (the crane tip) from a current starting or initial coordinate position (SP) in the initial state to a desired target coordinate position (TP) in the space. In this context, it should be understood that the operation processing module 2c controls and monitors both each of the actuators and activators 23, 24, 25, 26 that operate the different crane parts as well as the different measuring elements 31, 32, 33, 34 that detect the mutual state between the different crane parts in the crane.

By means of measurement data from the measuring elements 31, 32, 33, 34, the crane control 2 can continuously determine the mutual geometric state between the crane pillar 10, the first crane arm 11, the second crane arm 12 and the sliding boom 13 and on the basis of these calculate the crane tip TCP state in the three-dimensional space in a coordinate system denoted X, Y, Z in FIG. 3. With the measuring elements 31, 32, 33, 34, in addition to the mutual geometric position between the parts included in the crane arm system 10, velocity and acceleration for each pivot point (node) can also be detected and calculated in the control unit 2, and linear sliding control in the shaft studs 10a, 11a, 12a and 13a included in the crane 1 arm system or in the crane tip TCP with respect to a given zero, for example in the crane base 22 of the arm system 10. As each pivot point of the crane 1 with regard to each defined degree of freedom q1, q2, q3, d of the crane arm system is related to a system of orthogonal coordinate axes in a three-axis coordinate system in the space, the relative state of the crane tip TCP relative to the crane base 22 can be achieved mathematically through transformation. Said crane base 22 can hereby function as a zero node NO in the coordinate control system; alternatively the attachment of the first crane arm 11 to the crane pillar 10 should constitute the zero node. It should be understood that the zero node NO in principle can be constituted by any defined point in the crane 1. Thus, it is possible to continuously determine the coordinate of the crane tip TCP state relative to this zero and thereby, by means of operation module 2c included in the control unit 2, control the crane tip TCP to move along a path desired by the operator based on a route established by the route establishment module 2b by establishing an effective operation path for each node.

However, it should be understood that the description above substantially constitutes prior art known for a long time for crane controls using coordinate and crane tip control of cranes.

As mentioned initially, it is desirable to obtain a crane 1 with a crane control 2 that is more suitable to use in the operator-controlled type of cranes included in for example forest machines or similar crane-carrying work vehicles.

The core of the invention is based on the insight that calculation of the actual displacement of the crane tip TCP from a current starting position SP to a target position GP in a simple manner can be determined by, in a preparatory fictional calculation step, partly giving freedom to and partly locking a specific number of degrees of freedom q1, q2, q3, d in the crane arm system in order to form a fictional arm system, wherein each degree of freedom, i.e. in practice each pivot point (node N1, N2, N3, N4) or slidably moveable part) included in the arm system 10, in a number of (n) fictional successive translative displacement steps TS:1-TS:n, motions are only allowed in two linear directions in x and y directions that intersect each other in a fictional point B that is generated in the preparatory calculation step. The fictional point B is no real point in the coordinate system, but is merely created to simplify the mathematics in the calculation step. Correspondingly, the other displacement steps TS:1-TS:n of the coordinate control in each degree of freedom q1, q2, q3, d are divided into a number of successive fictional speed components in at least x and y directions. To facilitate the understanding, the motion of the crane arm system above is merely described on the basis of a motion in a vertical plane in the x and y directions in the space, i.e. in motion in/out and up/down in the plane. By including the swing of the crane arm system about the z axis and the degree of freedom q1, the crane arm system can reach each point in the space with application based on a quadric coordinate system. By applying a cylindrical coordinate system, the swing function takes place separately, and the algorithm should therefore only process the degrees of freedom q2, q3, d and speed components in x and y directions to reach, in combination with the separate swing function, each desired target point (node) in the space.

Generating a control strategy in a preparatory step in this manner based on an instruction from the operator's control command, partly assigning motion freedom, partly locking nodes (pivot points) in the arm system during the fictional translative displacement steps, the calculations in the crane control can be substantially simplified, and the need for complicated Jacobian matrices with approximate weighting matrices used in prior art for cranes with crane controls can be avoided. The instruction of the operator's control command is obtained in respect of operator's desired change of position In (−dX), Out (+dX), Up (+dY), Down (−dY) for said displacement of the crane tip (TCP) relative to the main plane of the coordinate system in the space, from a starting position SP to a target position GP of the crane tip TCP.

Figure 5:
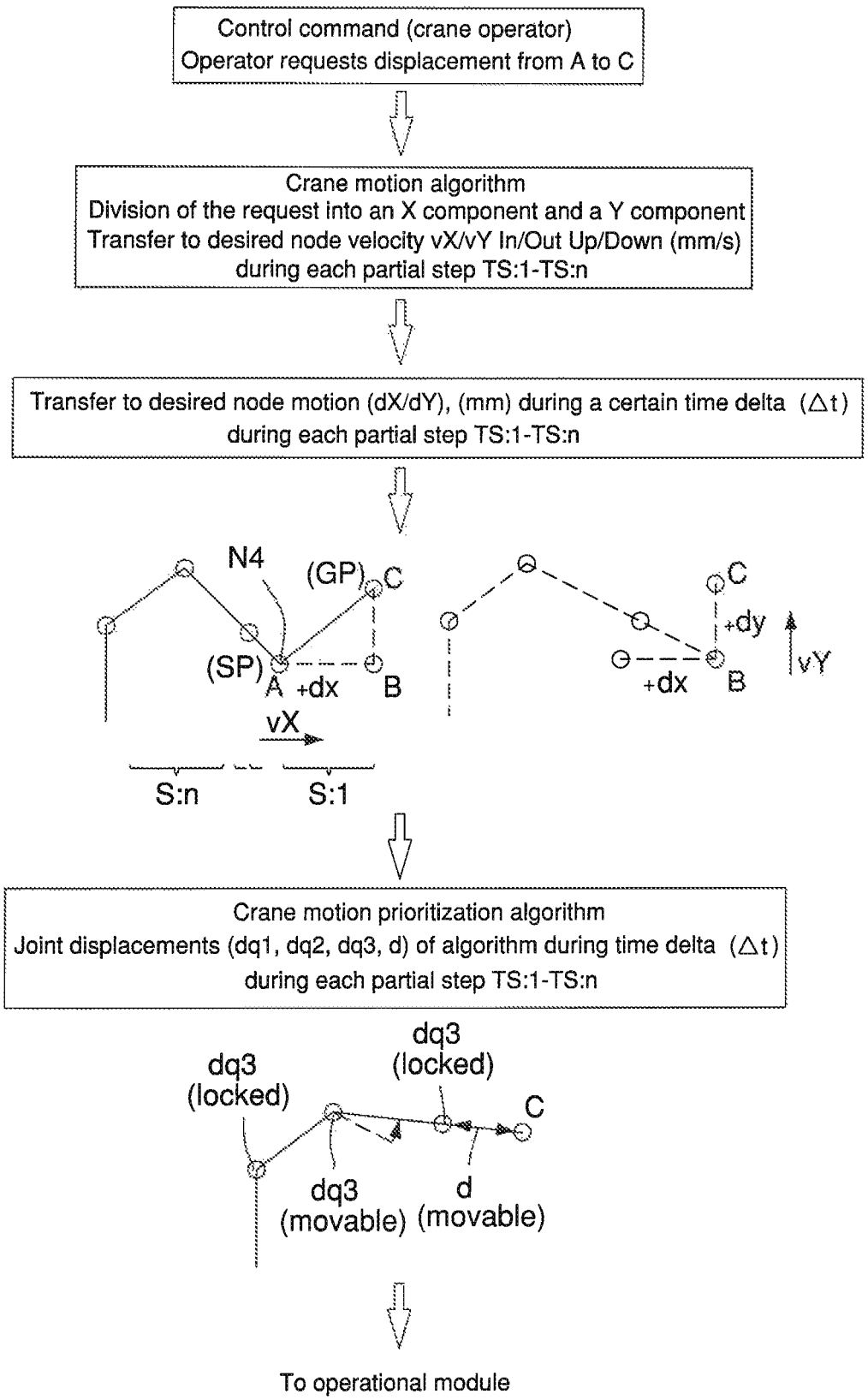
Figure 6:
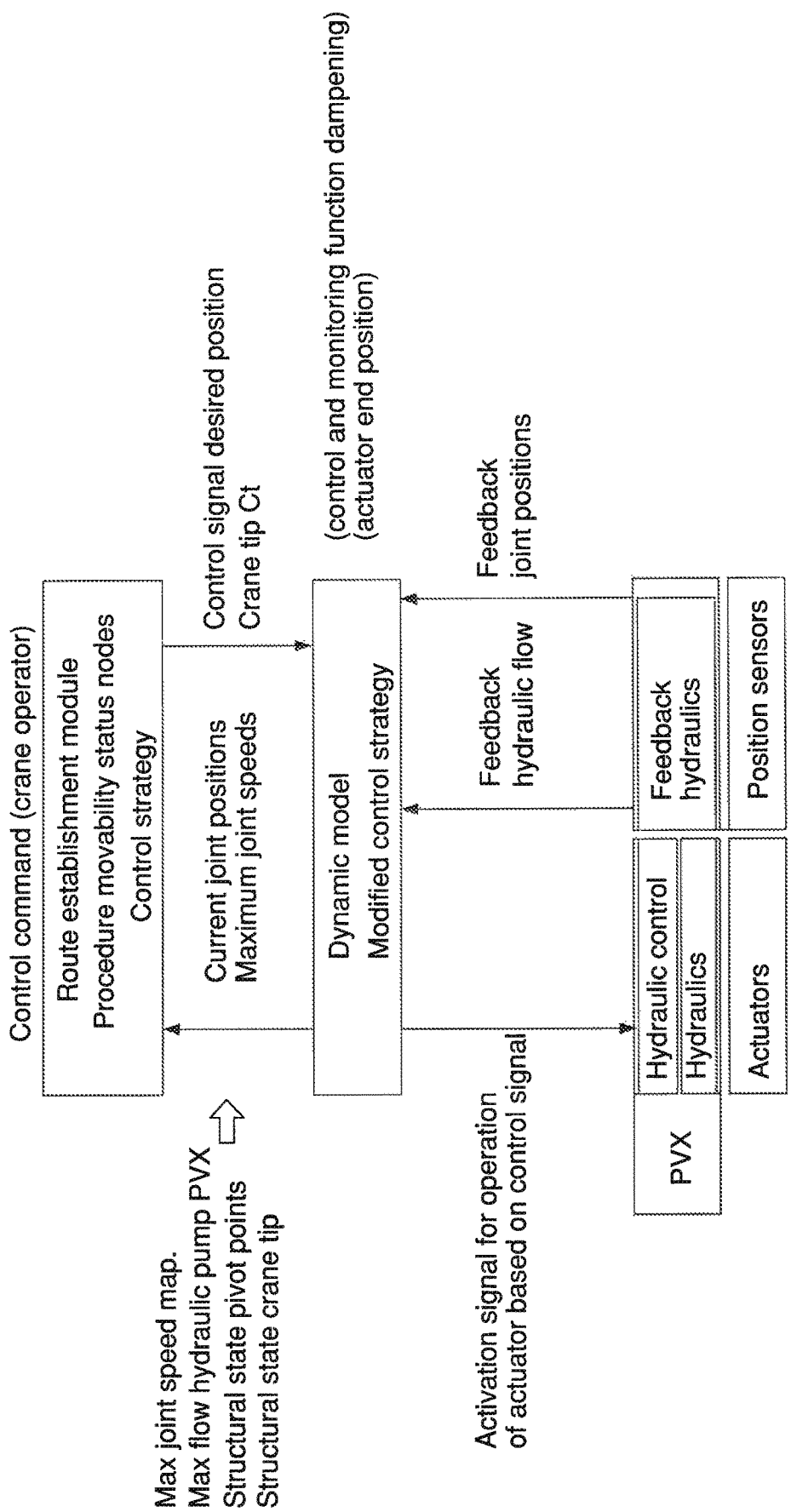

With reference to FIG. 5, the crane control 2 according to the invention is adapted to prepare an actual displacement of the crane tip TCP from a current starting or initial coordinate position SP of the crane tip TCP to a desired target coordinate position GP of the crane tip TCP by, in a number of successive steps of one or a plurality of the crane arm system's degrees of freedom in the nodes N1, N2, N3, N4, performing a fictional displacement of at least one horizontally oriented joint shaft, which simultaneously defines a Node A of the lift arm system of a first partial stretch dX outwards to a fictional position of the node in B and further in a second partial stretch dY to position C upwards, wherein said respective partial stretches dX, dY are situated in planes that are orthogonal or perpendicular to each other. The B node that arises in the intersection point between the partial stretches dX and dY is a fictional node that is generated during the preparatory calculation step. During said fictional stepwise displacement, the crane control 2 ensures that a predetermined number of degrees of freedom in the other nodes N1, N2 in the pivot pins N4 in the crane tip TCP are assigned a predetermined mobility status, implying that the nodes are either locked against motion or are freely moveable during each partial step TS:1-TS:n in the preparatory calculation step.

Example 1

Also with reference to FIG. 5, a block diagram illustrates how a crane operator by using a joystick requests a control command implying displacement of the crane tip TCP from a starting position SP in A (crane tip node N4) to a target position GP in C. The operator's command is carried out via the normal operator interface with two analogue, 2-axial joysticks 20a, 20b. The deflection of the joysticks are translated into a desired velocity of the crane tip TCP. The velocity is translated into a physical crane position by calculating the displacement during a fixed delta time $\Delta t$, and as described in more detail below, this provides input to the algorithm calculating fixed crane positions.

Thus, an algorithm included in a node information processing module 2a divides the requested displacement into a first velocity vector Vx for the first degree of freedom d (sliding boom and crane tip) for performing a fictional motion in a horizontal in/out component dX and a second motion vector Vy for the crane tip and execution of a fictional motion in a vertical up-down component dY. The procedure 5 comprised by the node information processing module 2a (see FIG. 4) for crane motion prioritization in respect of the operator's control command generates a control strategy that assigns a predetermined mobility status to the current node (the crane tip N4) and other nodes N1, N2, N3 of the crane. Thus, the algorithm divides the request into an X component and a Y component. The procedure outlined above is applied on the displacement in each direction and thereby results in an equation system with two unknown quantities and two equations, which is uniquely solvable mathematically.

More specifically, a free mobility status and a locked mobility status, respectively, is assigned to the node N4 at the crane tip, and said free mobility status implies that the node is only allowed to be displaced along a single partial stretch +dX, +dY or a combination of a first partial stretch dX and a second partial stretch dY, wherein such partial stretch constitutes a linear projection of an operation path for the node towards some of the main plane of the coordinate system, and said locked mobility status implies that the node is fixed against displacement. The procedure for the crane motion prioritization 5 is applied on the displacement in each direction and thereby results in an equation system for each "n" displacement step S:1-S:n with two unknown quantities and two equations, which is uniquely solvable mathematically. This algorithm is applied for deltaX/deltaY separately, which is obtained by applying the algorithm in two steps: First, a theoretical crane position is calculated with only displacement of the first degree of freedom d in X direction to a fictional position B, and subsequently the final crane position is calculated on the basis of the theoretical position and only displacement in Y direction from the fictional position B to the actual position C. As appears from FIG. 5, the first partial stretch dx positioned in a horizontal plane in the space, and the second partial stretch dY is positioned in a vertical plane in the space, and said partial stretches intersect each other in the fictional point B that is generated in the preparatory calculation step. At least one of the crane nodes N1, N2, N3, N4 in the coordinate control system is fixed against displacement during the preparatory calculation step during each fictional partial step TS:1-TS:n.

Thus, it should be understood that according to the invention, the crane motion in a pivot point as requested by the crane operator is divided into two discrete steps; In/Out (delta±X step) and Up/Down (delta±Y step). Due to this division, it is possibly by means of the predetermined rules controlled by the crane motion prioritization module 2d included in the crane control 2, to control which degrees of freedom q1, q2, q3, d (pivot and translation points) that are to move during the two discrete steps when the crane tip TCP (node N4) moves Out (delta+dX) to the fictional position B and in conclusion up (delta+dY) to finally reach the actual target position C. Furthermore, it should be understood that as the different nodes are only assigned locked mobility status in the fictional partial steps, the final calculation result implies that all defined nodes are usually also "assigned" a motion.

The crane tip motion TCP planned in the calculation step in the node information processing module 2a is further addressed to the route establishment module 2b, which establishes an effective operation path for each node N1, N2, N3, N4 for a route that is executed by the operation processing module 2c, so that the crane tip TCP moves according to the operator's control command.

Example 2

For the operator to avoid the inconvenience that the crane 1 suddenly stops due to inherent geometric or mechanical restrictions in the crane and that the crane tip TCP therefore does not reach the target point GP desired by the operator, the present crane with crane control 2 is provided with a dynamic model, which is configured to generate a modified control strategy with regard to a risk detected in the preparatory step of losing a degree of freedom q1, q2, q3, d of motion freedom in the crane by establishing a route for each node with a view to displacing the crane tip TCP for each effective operation path. In addition to geometric limitations in the crane 1, problems with lost degrees of freedom can appear through limitations of the state in the actuators and activators 23, 24, 25, 26 of the crane. The dynamic model controls and monitors the risk of losing a degree of freedom q1, q2, q3, d of motion in the crane 1 on the basis of at least one of the following parameters; data stored in the crane control 2 comprising predetermined static and dynamic limitations of the crane relative to loads or accelerations of the crane calculated in said preparatory calculation step, data stored in the crane control 2 comprising predetermined structural geometric limitations of state of the crane with associated arm parts 10, 11, 12, 13 as such or the actuators and activators 23, 24, 25, 26 included in the crane with respect to a control strategy generated in said preparatory calculation step, resulting in some of the actuators and activators having to pass their end position for the crane tip TCP to reach a desired target coordinate position TP in the space.

Example 3

The crane control 2 comprises software that continuously calculates occurring angle speeds in the pivot points of the crane 1 based on signals from the measuring elements 31, 32, 33, 34 that are provided for the pivotable assemblies 10*a*, 11*a*, 12*a*, 13*a* between the different crane parts. In a similar manner, the stroke length and motion speeds of the actuators and activators (hydraulic cylinders) are measured via linear measure sensors (similar to that of the measurement sensor 34 in the sliding boom 13). The crane control 2 is configured to reduce or limit the possible range of motion for each node. The crane tip TCP can usually move at a maximum speed until a subsequent predetermined node takes over the motion. If two or more nodes in the crane control reaches their limitation, the motion speed of the crane tip TCP can be affected, whereby the crane control 2 priority is to allow the crane tip to follow the indicated motion line along the route. If the displacement of the crane tip TCP desired by the operator implies that any of the actuators and activators 23, 24, 25, 26 used for operating the crane parts in the crane 1 approach an end position, the software included in the crane control ensures that the speed of the current crane part is successively reduced, so that the function stops softly just before it reaches the end position.

Example 4

As shown in FIG. 1*a* and FIG. 3, the dynamic model of the crane control 2 can also comprise a motion-restricting procedure that can restrict the range of motion of the joints wherein stored instructions for this can be used as input for the crane tip control algorithm. This data can comprise one or more of the following restrictions of motion; restriction of telescope speed of the sliding boom when displacing the crane tip TCP within one or a plurality "n" of predefined zones Z:1-Z:n in the three-dimensional coordinate system in the space, for example over a cargo compartment, if the vehicle that carries the crane is equipped with such superstructure component or close to a driver's cabin, cargo protection gate or the like, if the crane-carrying vehicle is equipped with such similar superstructure components, wherein it can be avoided that any of the lift booms or similar crane parts are unintentionally driven in to any of these.

What is claimed is:

1. A crane with a crane control, wherein the crane control comprises:
  a coordinate control system with a plurality of nodes defined in the crane and a three-axis coordinate system including x, y and z axes intersecting each other in orthogonal main planes in a space;
  a node information processing module, a route establishment module and an operation processing module, wherein the node information processing module is configured to collect and store node information in an initial state of the crane 4, and the route establishment module is configured, based on a control command indicated by a crane operator, to establish an effective operation path for each node to a route in which the operation processing module is used, in an actual route, to displace a crane tip included in the crane from a current starting or initial coordinate position in the initial state to a desired target coordinate position in the space, wherein the route establishment module is being configured, in a preparatory calculation, to plan an actual motion of the crane tip along a route by dividing the effective operation path of each of the plurality of nodes into a series of fictional partial steps, wherein each node is assigned a predetermined mobility status,
  wherein each of the plurality of nodes is assigned a free mobility status or a locked mobility status during each fictional partial step, and wherein said free mobility status implies that the node is only allowed to be displaced along a single partial stretch or a combination of a first partial stretch and a second partial stretch, and wherein each such partial stretch constitutes a linear projection of an operation path for the node towards some of the main plane of the coordinate system, and wherein said locked mobility status implies that the node is fixed against displacement,
  wherein a predetermined procedure generates a control strategy assigning a respective node its mobility status being based on an instruction in the operator's indicated control command,
  wherein the instruction of the operator's control command is performed in respect of the operator's desired change of position In, Out, Up, Down by displacement of the crane tip relative to the main planes of the coordinate system, and
  wherein the procedure is configured to select a control strategy based on at least one of following instructions indicated in the crane operator's control command at a desired speed of change in the state of the crane tip:
    motion command in an in/out component in the coordinate system,
    motion command in an up/down component in the coordinate system, or
    a combination of said motions in an in/out component and up-down component.

2. The crane according to claim 1, wherein the first partial stretch is situated in a horizontal plane in the space, and the second partial stretch is situated in a vertical plane in the space, and said partial stretches intersect each other in a fictional point that is generated in the preparatory calculation.

3. The crane according to claim 1, wherein the route establishment module is configured, in each of the series of fictional partial steps, to calculate a first fictional displacement of each of the plurality of nodes along the first partial stretch and displacement only in a horizontal plane in the space and subsequently calculate a second fictional displacement of each node along the second partial stretch and displacement only in a vertical plane in the space.

4. The crane according to claim 1, wherein at least one of the plurality of nodes in a coordinate control system is fixed against displacement during each of the series of fictional partial steps by the preparatory calculation.

5. The crane according to claim 1, wherein the route establishment module further comprises a dynamic model, which is configured to generate a modified control strategy in respect of a risk detected in the preparatory calculation of losing a degree of freedom of motion in the crane by establishing an effective operation path for each node to a route for displacing the crane tip.

6. The crane according to claim 5, wherein the dynamic model controls the risk of losing the degree of freedom of motion in the crane on a basis of at least one of following parameters:

data stored in the crane control, comprising predetermined static and dynamic limitations of the crane in respect of loads or accelerations in the crane calculated in said preparatory calculation, data stored in the crane control, comprising predetermined structural geometric state restrictions of actuators and activators included in the crane with respect to a control strategy generated in said preparatory calculation, resulting in some of the actuators and activators having to bypass in their end positions for the crane tip to reach a desired target coordinate position in the space.

7. The crane according to claim 1, wherein the route establishment module is configured to reduce or restrict the speed of change desired by the crane operator of the state of the crane tip, if any of actuators and activators included in the crane travel towards an end position, wherein the speed is successively reduced, such that a function of a current actuator and activator stops softly just before it reaches the end position.

8. The crane according to claim 5, wherein the dynamic model comprises a motion-restricting procedure that can restrict the motion speed of the plurality of nodes within one or a plurality of predetermined zones in a three-dimensional coordinate system in the space, and which data is are used as input to the route establishment module.

9. The crane according to claim 1, comprising the crane control configured, such that, via an operator interface, it is switched into different operating modes of which a first operating mode comprises operating mode for coordinate control, whereby the crane is controlled and monitored on a basis of the desired motions of the crane tip, a second operating mode for conventional manual control of the crane through separate control and monitoring of each actuator and activator of the crane.

10. The crane according to claim 1, comprising:
- a crane base;
- a pillar, which is rotatably mounted on the crane base and pivotable relative to the crane base about a vertical rotary shaft-defining a first degree of freedom of the crane;
- an operating device for rotating the pillar relative to the crane base;
- a crane arm system comprising a first and a second crane arm, which are articulately connected with each other and associated articulators and activators comprising hydraulic cylinders for lifting and lowering the crane arms, whereby the first crane arm of the crane arm system via a pivot pin is articulately connected with the pillar for pivoting about a horizontal joint shaft defining a second degree of freedom of the crane, and the second crane arm of the crane arm system via a pivot pin is articulately connected with the first crane arm for pivoting about a horizontal joint shaft, and which defines a third degree of freedom of the crane; and
- a sliding boom, which via an actuator and activator comprising a hydraulic cylinder, is slidably mounted in the second crane arm and slidable over a structural predetermined sliding area and has a fourth degree of freedom due to its slidable mounting.

11. A forest machine for tree handling, comprising a crane with the crane control according to claim 1.

12. The forest machine of claim 11, wherein the forest machine is a forwarder or a harvester.

* * * * *